May 24, 1955  S. F. PASTURCZAK  2,708,920
AIR INTAKE PRE-CLEANER
Filed Feb. 24, 1954  2 Sheets-Sheet 2

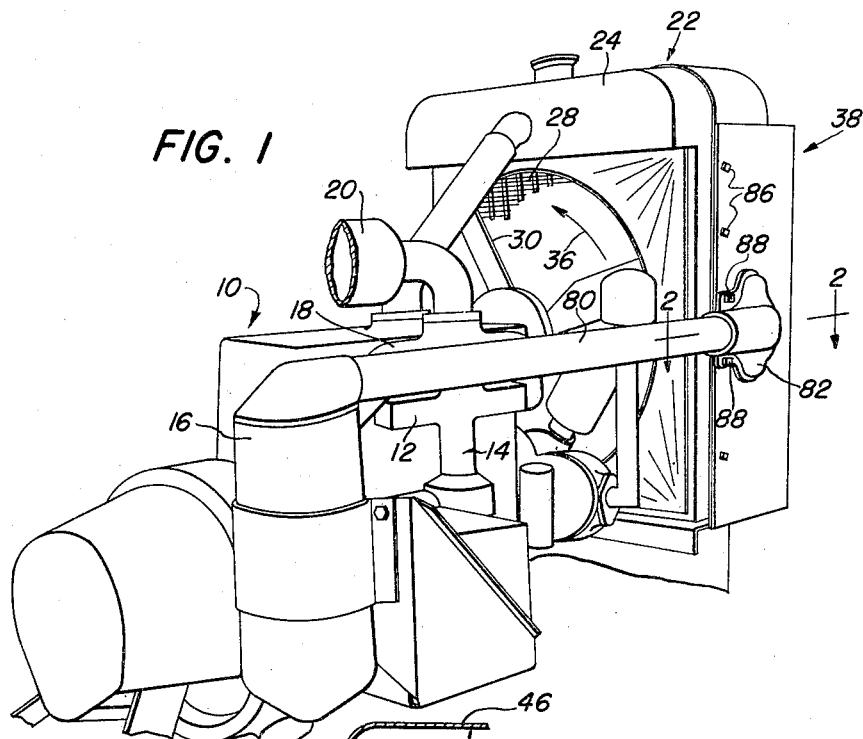
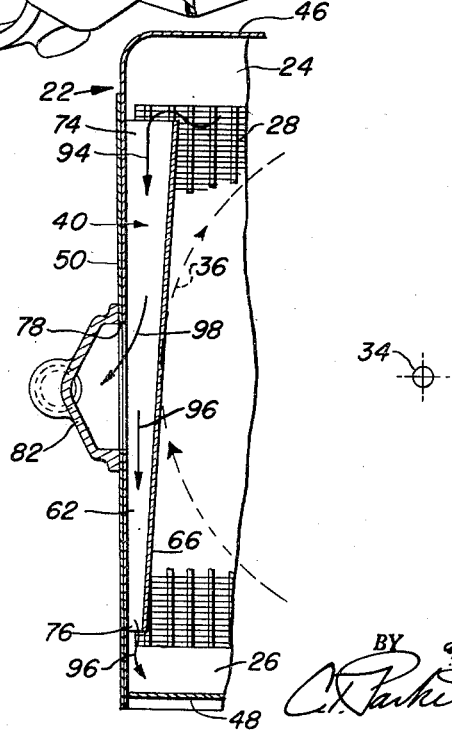

INVENTOR.
S. F. PASTURCZAK
ATTORNEYS

United States Patent Office 2,708,920
Patented May 24, 1955

2,708,920
AIR INTAKE PRE-CLEANER

Stanley F. Pasturczak, East Moline, Ill., assignor to Deere & Company, Moline, Ill., a corporation of Illinois Application February 24, 1954, Serial No. 412,338

6 Claims. (Cl. 123—119)

This invention relates to an air intake system and more particularly to cleaning apparatus therefor. Still more particularly, the invention relates to the use of a pre-cleaner or dirt deflector for an air cleaner of an internal combustion engine.

In the conventional air cleaner arrangement for an internal combustion engine, the air cleaner is mounted usually directly above the carburetor, with certain modifications, depending upon the particular use to which the engine is put. In the agricultural field, the conduit leading to the air cleaner is conventionally arranged at a substantial height above the engine so as to draw air from an air stratum in which the dust or other foreign material is in a relatively low proportion. In other instances, the inlet for the air cleaner will be positioned adjacent to the radiator, in some cases behind and in other cases ahead of the radiator, such installations deriving certain benefits in the way of increased volumetric efficiency of the engine, primarily because of the advantage of drawing in cooler air and further because of the ram effect incident to the use of a long air inlet conduit or column. The present invention pertains to an arrangement in which the inlet for the air cleaner is positioned ahead of the radiator and the primary object of the invention is to provide an improved intake of that character.

It is a significant object of the invention to utilize the air intake in conjunction with a screen and shield structure for the purpose of cleaning or filtering the cooling air, the air intake device operating to draw off part of the cleaned air for the air intake system of the engine. A further important object of the invention is to provide an improved air intake of relatively simple construction, and one that can be easily added to existing installations. Specifically, it is an object of the invention to utilize an air intake device in the form of an elongated funnel-shaped member in which air is taken in at the larger end to be drawn off at a point intermediate the ends, dirt and other foreign material passing outwardly through the smaller end. It is a further object of the invention to locate the device, which will be hereinafter designated a pre-cleaner, in such position relative to the air mass induced by the engine fan as to take in air in which dirt and other foreign material is at a substantial minimum.

The foregoing and other important objects inherent in and encompassed by the invention will become apparent as a preferred embodiment of the invention is disclosed in detail in the following detailed description and accompanying sheets of drawings in which:

Fig. 1 is a perspective view of an internal combustion engine having a radiator equipped with the shield structure and pre-cleaner device of the invention.

Fig. 5 is a fragmentary vertical sectional view as seen substantially along the line 5—5 of Fig. 2.

Figure 2:
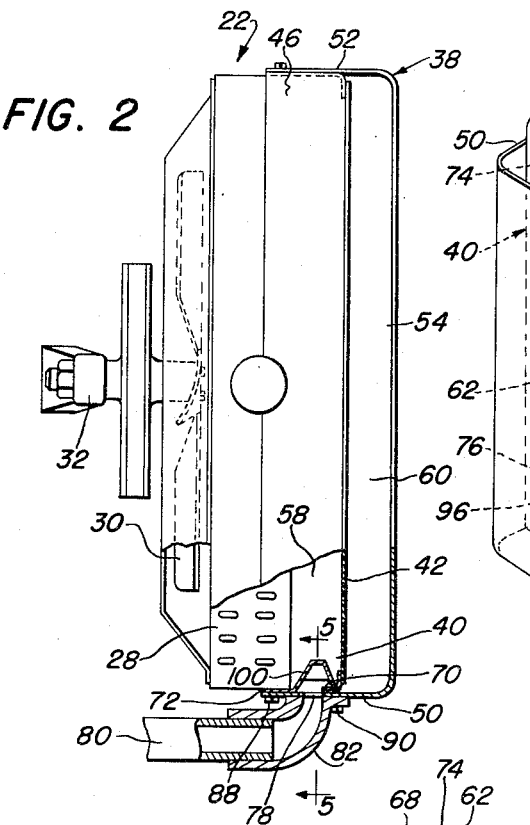
Fig. 2 is an enlarged plan view of a forward portion of the structure shown in Fig. 1, with a part of the view being in section as seen along the line 2—2 of Fig. 1.

The internal combustion engine, designated generally by the numeral 10, may be considered representative of any conventional type. It has an intake manifold 12 to which are connected in the usual manner a carburetor 14 and air cleaner 16. The engine includes an exhaust manifold 18 and a conventional spark arrestor 20.

Positioned upright ahead of the engine 10 is a radiator 22 comprising an upper tank 24, a lower tank 26 and a core 28. A typical cooling fan 30 is carried on a suitable support 32 at the front of the engine and behind the core 28 for rotation about a horizontal axis (designated at 34 in Fig. 5) normal to the plane of the radiator 22.

Figure 3:
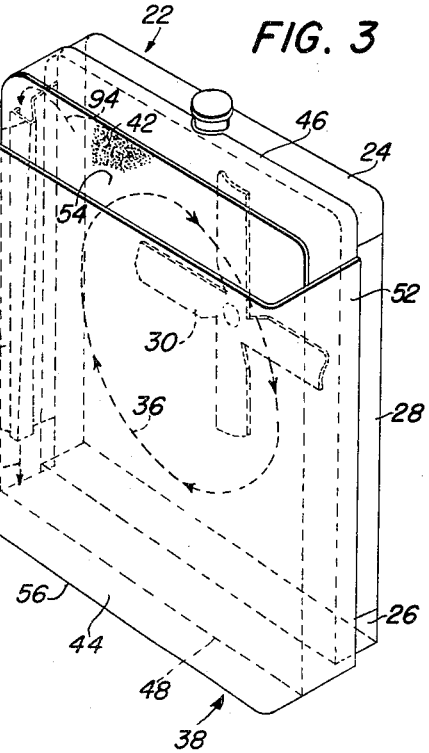
Fig. 3 is a front perspective view of the radiator and screen and shield structure, the pre-cleaner device being shown in dotted lines.

The direction of rotation of the fan is designated by the full-line arrow 36 in Fig. 1 and by the dotted-line ellipse and arrows, also 36, in Fig. 3. The same designation is used for the dotted-line arc and arrows in Fig. 5.

To the extent described, the arrangement is not unconventional, the rotating fan 30 operating to induce an air current or stream through the radiator core 28 for cooling purposes.

The conventional operation is modified, according to the present invention and according to applicant's copending application, Serial No. 412,210, filed February 24, 1954, by the addition of combined shield and screen structure, designated in its entirety by the numeral 38, and further by a pre-cleaner device, designated in its entirety by the numeral 40. The combined shield and screen structure forms the subject matter of said copending application. The pre-cleaner device 40 functions particularly well in combination with the structure 38 but functions also as a separate element.

The structure 38 includes an upright screen 42 having substantially the same frontal area as the radiator 22 and positioned ahead of the radiator in spaced relation to the radiator core 28. The structure 38 further includes an upright imperforate shield or panel 44 having substantially the same frontal area as the screen 42 and positioned in spaced relation to and ahead of the screen 42 as best shown in Figs. 2 and 3. The combined structure includes top and bottom walls 46 and 48 and opposite side walls 50 and 52 for the purpose of interconnecting the radiator, the screen and the shield in such manner as to totally enclose the structure against the entrance of air except for air inlets 54 and 56 respectively at the top and bottom of the space between the screen 42 and the shield or panel 44. That is to say, the top and bottom walls 46 and 48 may be parts of a peripheral band that surrounds the screen and connects it to the radiator so that the space—designated for convenience by the numeral 58—between the front of the radiator and the back of the screen 42 is completely enclosed against the entrance of non-screened air. The side walls 50 and 52 may be integral extensions of the shield or panel 44 and enclose the space—designated for convenience by the numeral 60—between the screen and shield or panel only at the sides, thereby leaving the top and bottom air inlet openings 54 and 56. The particular arrangement and the functional characteristics of this system are covered in the above-mentioned copending application but will be described briefly here for purposes of orientation. As the cooling fan 30 rotates in the direction indicated by the numeral 36, air is drawn downwardly through the top opening 54 and upwardly through the bottom opening 56, this air mass rotating within the space 60 as it passes through the screen 42 and then through the radiator core 28. It is believed that as the air mass rotates, foreign particles entrained in the air are separated because of their own inertia and consequently depart from the space 60 via the openings 54 and 56. Those particles of foreign materials that are drawn to the screen 42 are caused to rotate thereon in such manner as to ultimately move to outer peripheral portions of the screen where the air pressure through the screen diminishes, whereupon these particles either drop off the screen or are blown upwardly through the opening 54. As would be expected, of course, smaller fragments or fine dust pass through the screen 42 but these are normally of such small size as to pass completely through the core 28, the desideratum in any case being to avoid clogging of the core.

Figure 4:
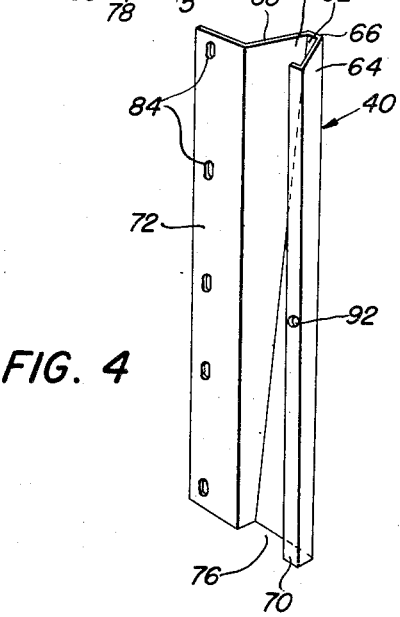
Fig. 4 is a perspective view of the pre-cleaner device itself.

The pre-cleaner 40, shown by itself in Fig. 4, comprises what may be termed a funnel-shaped channel 62 having a plurality of angularly related walls 64, 66 and 68, the walls 64 and 68 being respectively flanged at 70 and 72 to provide means for effecting the mounting of the pre-cleaner 40 on the inner face of the side wall 50 of the structure 38. The mounting of the channel 62 on the inner face of the side wall 50 is such that the open side of the channel faces the inner face of the wall 50 so that the wall and the channel in effect form an upright elongated tubular member having a relatively enlarged upper end providing an air inlet or intake 74 and a relatively restricted or smaller open lower end providing a dirt or foreign-material outlet 76. The side wall 50 has, intermediate the top wall 46 and the bottom wall 48, an air outlet opening or aperture 78. Since the open side of the channel 62 faces the side wall 50, the opening 78 communicates with the interior of the tubular member formed by the channel and the wall 50.

The air cleaner 16 is equipped with an air inlet conduit 80 for leading air into the air cleaner. The forward end of the conduit 80 is equipped with a hollow connector 82 that overlies the opening 78 to establish communication between the interior of the pre-cleaner 40 and the air cleaner 16. As shown in Fig. 2, the flange 72 is positioned between the connector 82 and one side of the radiator, having therein a plurality of apertures 84 through which cap screws 86 are passed to hold the assembly together. A pair of these cap screws, as at 88 in Figs. 1 and 2, pass through one portion of the connector 82. An additional cap screw 90 passes through another aperture in the side wall 50 and into a tapped aperture 92 in the pre-cleaner flange 70.

Because of the funnel or tapered shape of the channel 62, the air inlet or intake end 74 is larger than the dirt outlet 76. This relationship is important because of the positioning of the pre-cleaner 40 in the space 58 and along the upright side wall 50, in this location being closely adjacent to the radiator and more particularly having its length substantially tangent to the circle created by rotation of the engine fan 30, as suggested by the ellipse 36 in Fig. 3 and the arc 36 in Fig. 5. The upper or air intake end 74 of the pre-cleaner is above the fan axis 34 and lies in that quadrant of the fan circle in which movement of the fan is upwardly first in the direction of the end 74 and then laterally away from said end 74. The disposition of the pre-cleaner 40 is also such that its lower or outlet end 76 lies in that quadrant of the fan circle immediately preceding the above-mentioned quadrant in which lies the intake end 74 of the pre-cleaner.

As previously described, the function of the shield structure 38 is to control the air drawn in by the fan in such manner that the air mass rotates first in the space 60 before being drawn through the screen 42 into the space 58. Of course, the air mass will continue to rotate in the space 58 but it will be substantially cleaner in that space than it was in the space 60, because of the cleaning action accomplished in the space 60 in the manner previously described. The location of the air intake end 74 of the pre-cleaner 40 as previously described places the end 74 in a position in which there is the smallest amount of turbulence in the air drawn through the structure 38 by the fan 30. Moreover, the general direction of rotation of the air mass will be as indicated at 36, which, as already indicated, is away from the intake end 74. Consequently, the velocity of the air mass at this point is relatively low and the intake system of the engine is capable of drawing off a part of the air in that zone as indicated by the arrow 94 in Fig. 5. Although the rotation of the fan in the quadrant next preceding that in which the air intake 74 is located may be such as to impel air in the direction of the air outlet 76 of the pre-cleaner, it will be noted that the outlet 76 is substantially smaller than the intake 74. Therefore, the air will tend to enter at 74 rather than at 76.

As the secondary air stream induced by the air intake system through the pre-cleaner 40 travels downwardly in the direction indicated by the numeral 94, any dirt or other foreign material entrained in this air stream will, because of its own inertia, tend to carry past the side opening 78, as represented by the arrow 96 (Fig. 5) and the relatively clean air will be drawn through the opening 78 as represented by the arrow 98 in Fig. 5. Since the outlet 76 is open, although somewhat restricted relative to the size of the inlet or intake opening 74, foreign material, as well as moisture that may accumulate while the engine is standing idle in inclement weather, may readily escape through the dirt or foreign-material outlet.

As best shown in Fig. 2, the general triangular shape of the pre-cleaner 40 enables the disposition of the pre-cleaner in close proximity to the front of the radiator 28 yet the shape provides a space, designated generally by the numeral 100, in which the radiator core at that point is not covered by the pre-cleaner. Therefore, the location of the pre-cleaner does not interfere with the efficiency of the radiator as a whole.

Throughout the specification and in the appended claims, expressions such as "upright," "upper," "lower," etc. have been used, but this is more a matter of convenience and clarity rather than one of imposing limitations on the spirit and scope of the invention, since quite obviously the structural arrangement may be such that the air inlet openings 54 and 56 of the structure 38 are at the sides of the structure and the pre-cleaner 40 may be in a horizontal position, due regard being had to the relationship of the pre-cleaner to the location and direction of rotation of the fan. Various other aspects of the invention not specifically emphasized herein will undoubtedly occur to those versed in the art, as will numerous modifications and alterations in the preferred embodiment of the invention illustrated, all of which may be achieved within the spirit and scope of the invention as taught in the instant disclosure.

What is claimed is:

1. In an internal-combustion engine having an intake manifold and an air cleaner connected thereto and further including an upright radiator behind which a cowling fan rotates on an axis normal to the radiator to draw through the radiator from in front thereof, the improvement residing in a pre-cleaner for the air cleaner, comprising: an elongated upright tubular member positioned adjacent to the radiator and laterally to one side of the fan axis with its length generally tangent to the circle created by the rotating fan, said member having a relatively enlarged open upper end providing an air intake and a relatively restricted open lower end providing a dirt outlet, said member being further of such length and so positioned that its upper end is above the level of the fan axis and lies in that quadrant of the fan circle in which movement of the fan is upwardly and laterally away from said upper end and its lower end is below the level of the fan axis and lies in that quadrant of the fan circle immediately preceding the first-mentioned quadrant; and conduit means connected at one end to the air cleaner and at its other end to the tubular member intermediate said upper and lower ends of said member.

2. The invention defined in claim 1, in which: the pre-cleaner member is generally funnel-shaped, having angularly related straight upright walls converging from top to bottom.

3. The invention defined in claim 1, including: an upright supporting plate mounted on one side of the radiator and coextensive in length with the pre-cleaner member, said plate having an aperture therein intermediate its ends, said member being mounted on said plate with the interior of said member in communication with said aperture; and said conduit means communicating with the member via said aperture.

4. In an internal-combustion engine having an intake manifold and an air cleaner connected thereto and further including an upright radiator behind which a cooling fan rotates on an axis normal to the radiator to draw through the radiator from in front thereof, the improvement comprising: shield and screen structure including an upright screen spaced ahead of and substantially equal in frontal area to the radiator and an upright imperforate shield spaced ahead of and substantially equal in frontal area to the screen, and top and bottom walls and opposite upright side walls interconnecting the radiator and shield and screen structure and enclosing said structure and the spaces between the radiator, the screen and the shield against the entrance of air except for top and bottom air inlet openings respectively at the top and bottom of the space between the shield and screen, whereby the rotating cooling fan draws air through said openings then through the screen and then through the radiator; and a pre-cleaner for the air cleaner including an elongated upright tubular member positioned in the space between the radiator and the screen and adjacent to one of the side walls of the shield and screen structure with its length generally tangent to the circle created by the rotating fan, said member having a relatively enlarged open upper end providing an air intake and a relatively restricted open lower end providing a dirt outlet, said member being further of such length and so positioned that its upper end is above the level of the fan axis and lies in that quadrant of the fan circle in which movement of the fan is upwardly and laterally away from said upper end and its lower end is below the level of the fan axis and lies in that quadrant of the fan circle immediately preceding the first-mentioned quadrant; and conduit means connected at one end to the air cleaner and at its other end to the tubular member intermediate said upper and lower ends of said member.

5. In an internal-combustion engine having an intake manifold and an air cleaner connected thereto and further including an upright radiator behind which a cooling fan rotates on an axis normal to the radiator to draw through the radiator from in front thereof, the improvement comprising: shield and screen structure including an upright screen spaced ahead of and substantially equal in frontal area to the radiator and an upright imperforate shield spaced ahead of and substantially equal in frontal area to the screen, and top and bottom walls and opposite upright side walls interconnecting the radiator and shield and screen structure and enclosing said structure and the spaces between the radiator, the screen and the shield against the entrance of air except for top and bottom air inlet openings respectively at the top and bottom of the space between the shield and screen, whereby the rotating cooling fan draws air through said openings, then through the screen and then through the radiator; one of said side walls having an air outlet opening therein intermediate the top and bottom walls; and a pre-cleaner for the air cleaner, including an elongated upright channel positioned in the space between the radiator and the screen with the open side of the channel facing said one side wall to communicate said air outlet opening with the interior of the channel, said channel being mounted on said one side wall to afford an upright tubular member having its length generally tangent to the circle created by the rotating fan, said tube having a relatively enlarged open upper end providing an air intake and a relatively restricted open lower end providing a dirt outlet, said member being further of such length and so positioned that its upper end is above the level of the fan axis and lies in that quadrant of the fan circle in which movement of the fan is upwardly and laterally away from said upper end and its lower end is below the level of the fan axis and lies in that quadrant of the fan circle immediately preceding the first-mentioned quadrant; and conduit means connected at one end to the air cleaner and at its other end to the tubular member via said air outlet opening.

6. In an internal-combustion engine having an intake manifold and an air cleaner connected thereto and further including an upright radiator behind which a cooling fan rotates on an axis normal to the radiator to draw through the radiator from in front thereof, the improvement residing in a pre-cleaner for the air cleaner, comprising: an elongated tubular member positioned adjacent to the radiator and spaced radially from the fan axis so that its length is generally tangent to the circle created by the rotating fan, said member having a first relatively enlarged open end providing an air intake and a relatively restricted open second end providing a dirt outlet, said member being further of such length and so positioned that its air inlet end lies in that quadrant of the fan circle in which movement of the fan is along said member first in the direction of and laterally away from said air inlet end and its dirt outlet end lies in that quadrant of the fan circle immediately preceding the first-mentioned quadrant; and conduit means connected at one end to the air cleaner and at its other end to the tubular member intermediate said air inlet and dirt outlet ends of said member.

No references cited